April 4, 1939. O. WITTEL 2,153,220
EJECTOR FOR MOTION PICTURE APPARATUS OF THE MAGAZINE TYPE
Filed Jan. 11, 1935
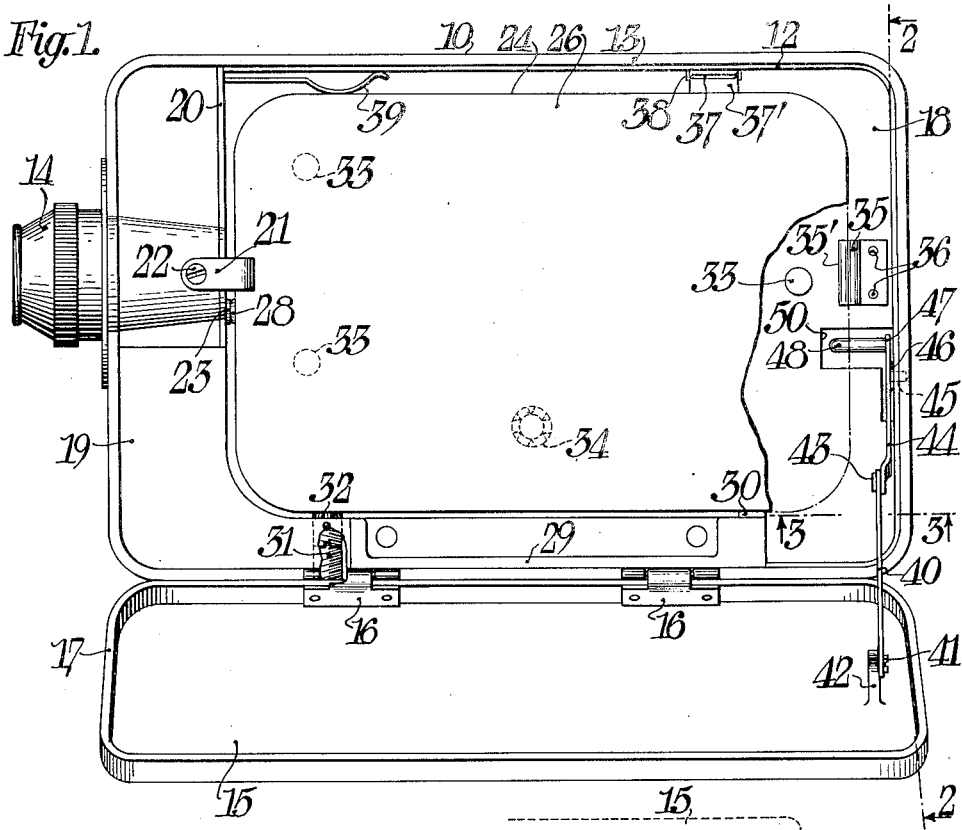
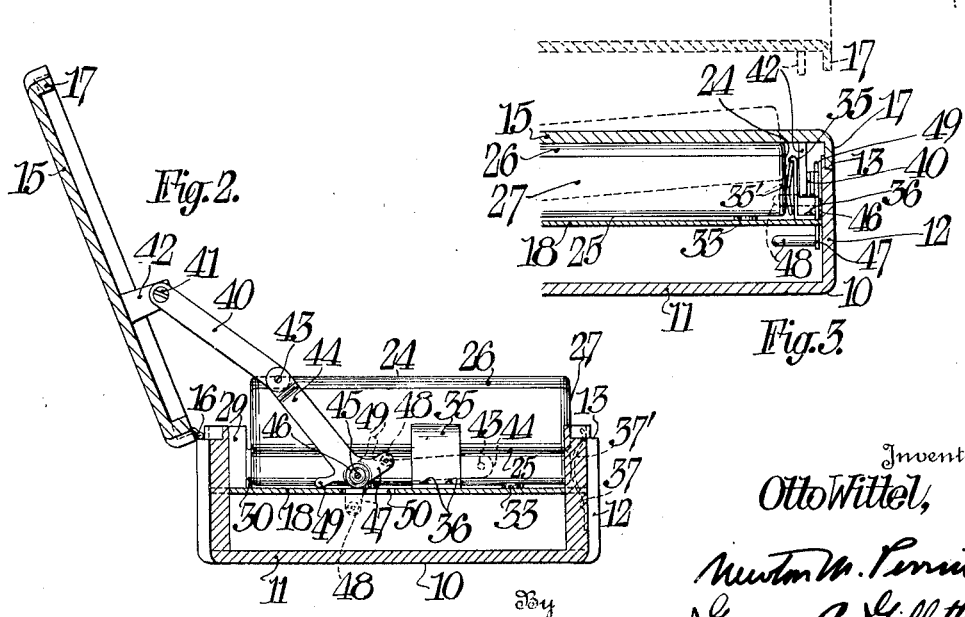
Inventor:
Otto Wittel,
Newton M. Pinnies
George A. Gillette, Jr.
Attorneys Patented Apr. 4, 1939

2,153,220

UNITED STATES PATENT OFFICE 2,153,220

EJECTOR FOR MOTION PICTURE APPARATUS OF THE MAGAZINE TYPE

Otto Wittel, Rochester, N. Y., assignor, by mesne assignments, to Eastman Kodak Company, Jersey City, N. J., a corporation of New Jersey Application January 11, 1935, Serial No. 1,372

5 Claims. (Cl. 88—17)

The present invention relates to an ejecting means for removing film magazines from motion picture apparatus and more particularly to an ejector which moves said film magazine into a position in which the magazine is more accessible to the operator.

When film magazines are mounted compactly in motion picture apparatus, the removal of these magazines from the apparatus is oftentimes very inconvenient and awkward.

The primary object of the present invention is the provision, in a motion picture apparatus of the magazine type, of an ejecting means for moving a film magazine to a more accessible position upon opening of the apparatus.

Another object of the invention is the provision in a motion picture apparatus containing a film magazine of an ejecting means which is operated by the cover of the magazine chamber in the apparatus and which displaces the film magazine so that it may be readily grasped by the operator.

A further object of the invention is the provision in a magazine chamber of a positioning means which engages the film magazine to hold it in position and which assists in ejecting the magazine from the chamber after said magazine has been laterally displaced a predetermined amount.

Still another object of the invention is the provision of positioning means within a magazine chamber which cooperate with an ejecting means so that displacement of the film magazine by the ejecting means causes the positioning means also to function as an ejector.

Other and further objects of the invention will occur to those skilled in the art by the disclosure which follows.

The above and other objects of the invention are obtained in a motion picture apparatus having a magazine chamber and cover therefor, having a positioning or resilient means for maintaining the film magazine in an operative position, and including an ejecting means which displaces the magazine upon opening of the cover to move said magazine into an accessible position. The positioning or resilient means may be composed of a spring with a curved portion which will act to locate the magaine in its operative position, but which will also act to eject the magazine after a predetermined lateral displacement thereof by the ejecting means upon opening of the cover.

Reference is hereby made to the accompanying drawing, wherein similar reference characters designate similar elements and wherein:

Fig. 1 is a side elevation of a motion picture camera containing a film magazine and having a cover which is shown in open position.

Fig. 2 is a cross-section of the assembled camera and magazine taken on the line 2—2 of Fig. 1.

Fig. 3 is a fragmentary section through the camera taken on the line 3—3 of Fig. 1, showing the cover in closed position and indicating, by dotted lines, an open position of the cover.

While the invention is to be described in connection with a motion picture camera, it is understood that the features of the invention are equally advantageous when the invention is applied to other motion picture apparatus of the magazine type, such as projectors or viewing devices.

In the illustrated embodiment of my invention, the camera comprises a casing 10 having a side wall 11 and a lateral wall 12. The lateral wall 12 is provided with a recess 13 along its upper edge. A photographic objective 14 is affixed in a known manner to the front of the camera casing 10.

A cover 15 is pivotally connected to the casing 10 by a pair of hinges 16 and has a rim 17 which cooperates with the recess 13 of the casing 10 to form a light-tight connection between said casing 10 and the cover 15.

A mechanism plate 18 is intermediately located within the casing 10 and forms one side of the magazine chamber therein. A cover plate 19 encloses one side of a mechanism chamber which extends along the front lateral wall 12 of the casing 10 and which is enclosed at the rear by a transverse plate 20. A positioning spring 21 is attached to cover plate 19 by a bolt 22 and extends over the edge of transverse plate 20 into the magazine chamber for a purpose later to be described. The transverse plate 20 is provided with an embossing 23.

The film magazine 24 may be of conventional type but is preferably of the type disclosed in my co-pending application Serial No. 620,176, filed June 30, 1932, for Method and apparatus for feeding motion picture film. The film magazine has a side wall 25, a cover 26 and an edge or lateral wall 27. The front lateral wall 27 of film magazine 24 carries a rivet 28 which is located to register with the embossing 23 on transverse plate 20 when the film magazine is placed in operative position within the magazine chamber.

The lower edge of film magazine 24 is supported by a bar 29 which has a head 30 engaging the edge wall of magazine 24 near one end and which is provided with a threaded bore 31 containing a threaded stud 32. The stud 32 forms an adjustable support for the magazine 24 near its front end and is available through the threaded bore 31 for adjustment. A plurality of embossings 33 are positioned at desired locations on mechanism plate 18 and engage the side wall 25 of the film magazine 24 when it is in operative position within the camera. The film magazine may be operated by a clutch element 34 which extends through mechanism plate 18 to engage an appropriate part on the film magazine and which may be driven by suitable means within the camera, such as a spring motor (not shown).

A plurality of positioning or resilient means are located within the magazine chamber and enclosed by the casing 10 and its cover 15. Such a means may include a spring 35 which is fastened by rivets 36 to the mechanism plate 18 and which has a curved portion 35', see Fig. 3, or such means may be provided by a spring 37 which also has a curved portion 37' and which may be fastened to the side wall 12 of casing 10, see Fig. 2. The mechanism plate 18 is provided with a recess 38 for the spring 37. An additional spring 39 is also mounted within the magazine chamber but performs only a positioning function and does not assist in ejecting the film magazine 24 as do the springs 35 and 37.

When the film magazine 24 is in operative position, as shown by the full lines in Fig. 3, the side wall 25 is parallel to mechanism plate 18 and springs 35 and 37 centrally engage the lateral wall 27 of the magazine. In this manner springs 35 and 37 urge the magazine 24 against head 30 and threaded stud 32, and urge rivet 28 against embossing 23. At the same time, positioning spring 21 engages the cover 26 of the film magazine 24 and urges the side wall 25 of the magazine against the embossings 33. In this manner the film magazine 24 is quite accurately located within the magazine chamber of the camera. Obviously, the small clearances between the lateral walls 12 of the casing 10 and the lateral walls 27 of the film magazine 24 would make it difficult to remove the film magazine from this operative position in which it is resiliently held. Consequently, the outstanding feature of the invention is the provision of an ejecting means which will facilitate the removal of the film magazine from the magazine chamber.

The ejecting means comprises an operative connection which is actuated upon movement of the cover 15 to open position and which includes a member for engaging and laterally displacing the film magazine 24 within the magazine chamber. Such ejecting means may be composed of hinged braces which are pivotally connected to the casing 10 and to the cover 15. A hinged brace 40 is pivotally connected at one end by a screw 41 to a lug 42 on the interior of cover 15 and is pivotally connected at the other end by a stud 43 to a second brace 44. The brace 44 is pivotally connected to the rear lateral wall 12 of casing 10 by a screw 45 which extends through a forming 46 to provide clearance between brace 44 and the inner surface of lateral wall 12. Brace 44 has an arm 47 on which is positioned a pin 48. A tongue 49 is opposite arm 47 and is adapted to abut against the mechanism plate 18 to limit the opening of cover 15, see Fig. 2. The mechanism plate 18 is provided with an opening 50.

In closed position of the camera cover 15, the hinged braces 40 and 44 assume a folded position, as indicated by the dotted lines in Fig. 2, and the pin 48 is below the mechanism plate 18 under the opening 50 in the position illustrated in Fig. 3. In this closed position of cover 15 the film magazine 24 is pressed into operative position and is properly located, as previously explained, by the pressure of springs 35, 37, and 39 to urge the magazine against head 30 and threaded stud 32 and to force rivet 28 against embossing 23.

After the operating cycle of the apparatus, such as exposure of the film within the magazine, has been completed, the cover 15 is raised, the hinged braces 40 and 44 are rotated, and pin 48 rises through the opening 50 and strikes against the side wall 25 of film magazine 24. Continued opening movement of the cover 15 causes additional raising movement of the pin 48 and film magazine 24 is elevated with respect to the curved portions 35' and 37' on springs 35 and 37. When the lower edge of film magazine 24 passes the summits of the curved portions 35' and 37' of respective springs 35 and 37, the resilient action of said springs raises the film magazine 24 still farther. In fact, the action of these springs may lift the magazine 24 from the pin 48. The ejected position of the magazine 24 and an intermediate open position of the cover 15 are illustrated by the dotted lines in Fig. 3.

Many modifications of the invention disclosed herein may be made without departing from the spirit of said invention. The scope of the invention is defined in the appended claims.

Having now particularly described my invention what I desire to secure by Letters Patent of the United States and what I claim is:

1. In a motion picture apparatus, the combination with a casing providing a chamber for a film magazine, and resilient means within said chamber for engaging and locating a film magazine in an operative position within said chamber and formed to move said magazine after a predetermined displacement from said operative position into a more accessible position, of an ejecting means for moving the film magazine from said operative position and effecting said predetermined displacement of said magazine.

2. In a motion picture apparatus, the combination with a casing providing a chamber for a film magazine, and a spring within said chamber having a portion for engaging and locating a film magazine in an operative position and having another portion for engaging the magazine after a predetermined displacement of said magazine from said operative position and for moving the film magazine into a more accessible position, of an ejecting means for displacing the film magazine a predetermined distance from said operative position in engagement with the first-mentioned portion of said spring so that the second-mentioned portion of said spring may displace said magazine still farther into said accessible position.

3. In a motion picture apparatus, the combination with a casing providing a chamber for a film magazine, and a spring within said chamber having a curved portion for centrally engaging the film magazine and maintaining the same in operative position and also for engaging the edge of said magazine after a predetermined displacement to move the magazine into a more accessible position, of an ejecting means connected to said cover and for displacing the film magazine a predetermined distance from said operative position so that the curved portion of said spring engages the edge of said magazine and ejects it farther from said chamber.

4. In a motion picture apparatus, the combination with a casing provided with a magazine chamber into which a film magazine having lateral walls and an edge may be laterally inserted, a cover for enclosing said chamber and movable to uncover the same, and a spring within said chamber having a portion curved convexly with respect to the lateral walls of the inserted magazine for engaging centrally the lateral walls of said magazine to maintain the same in operative position and for engaging the edge of said magazine after a predetermined lateral movement thereof to move said magazine farther from said operative position, of an ejecting means connected to said cover and for laterally displacing said magazine upon opening of said cover to bring the edge of said magazine into engagement with the curved portion of said spring.

5. In a motion picture apparatus, the combination with a casing providing a magazine chamber adapted to receive a laterally inserted film magazine and containing a mechanism plate which forms one side of said chamber and which is provided with an opening, a cover hinged to said casing for enclosing the same but movable to an open position, and a spring within said chamber having a curved portion for maintaining said magazine in operative position and for urging said magazine, after a predetermined lateral displacement, into an accessible position, of a hinged brace pivotally connected between said cover and said casing and having a pin which enters the opening in said mechanism plate in enclosing position of said cover and which engages said magazine laterally to displace the same a predetermined distance upon movement of said cover to open position.

OTTO WITTEL.